United States Patent [19]
Finzel et al.

[11] Patent Number: 5,939,669
[45] Date of Patent: Aug. 17, 1999

[54] UNDERGROUND CONTAINER

[75] Inventors: Lothar Finzel, Unterschleissheim; Guenter Einsle, Munich, both of Germany

[73] Assignee: Siemens Aktiengesellschaft, Munich, Germany

[21] Appl. No.: 08/971,889

[22] Filed: Nov. 17, 1997

[30] Foreign Application Priority Data

Nov. 15, 1996 [DE] Germany .......................... 196 47 397

[51] Int. Cl.⁶ .................................................. H02G 9/06
[52] U.S. Cl. .................. 174/38; 174/37; 174/50
[58] Field of Search ................. 174/50, 37, 59, 174/60, 65 R, 38

[56] References Cited

U.S. PATENT DOCUMENTS

| | | |
|---|---|---|
| 599,162 | 2/1898 | Brown . |
| 1,754,600 | 4/1930 | Borden . |
| 2,360,304 | 10/1944 | McLoughlin et al. ............. 174/59 X |
| 3,390,224 | 6/1968 | Wyatt ................................. 174/37 |
| 3,764,034 | 10/1973 | Klugman . |
| 4,655,361 | 4/1987 | Clover et al. . |
| 5,190,408 | 3/1993 | Ozeki et al. ....................... 174/37 X |
| 5,241,136 | 8/1993 | Michaelis et al. ............... 174/65 R X |
| 5,258,572 | 11/1993 | Ozeki et al. ....................... 174/37 X |
| 5,422,436 | 6/1995 | Zachrai ............................. 174/65 R |

FOREIGN PATENT DOCUMENTS

| | | |
|---|---|---|
| 0 388 126 A2 | 3/1990 | European Pat. Off. . |
| 0 641 897 A1 | 8/1993 | European Pat. Off. . |
| 83 21 260 | 7/1983 | Germany . |
| 3602962 | 8/1987 | Germany . |
| 92 10 163 | 7/1992 | Germany . |
| 94 08 437 | 5/1994 | Germany . |
| 2 192 220 | 10/1986 | United Kingdom . |
| WO 95/16830 | 12/1994 | WIPO . |

*Primary Examiner*—Dean A. Reichard
*Attorney, Agent, or Firm*—Hill & Simpson

[57] ABSTRACT

An underground container has, in the upper region, a plinth-like open frame which encloses a box-like container to accommodate electronic subassemblies. The open frame prevents the penetration of water and dirt during mounting and repair work. The plinth-like open frame accommodates a sealing cover and a load bearing cover, both of which help prevent the penetration of water and dirt after installation of the container.

38 Claims, 4 Drawing Sheets

UNDERGROUND CONTAINER

BACKGROUND OF THE INVENTION

1. Field of the Invention

The invention relates to an underground container, which is intended to accommodate electronic subassemblies.

2. Description of the Prior Art

In currently available copper telephone networks, a cable branching point (CBP) is connected between the trunk cable area and the subscribers. The trunk cable area extends between the CBP and the exchange over several kilometers, whereas the branching area is restricted to a length of less than 1000 meters, on average this is about 300 meters. Over this distance it is also possible to transmit messages at considerably higher bit rates.

If it is intended to open up new services for the subscriber, the short lines in the branch area have the advantage that only the trunk cable area has to be re-equipped for higher data rates.

Since the trunk cable is mostly laid in pipes or cable ducts, it is possible, for example, for a new optical fiber cable, which, for example, replaces the previous trunk cable, to be laid without great effort. The subscribers are supplied with the new services following appropriate conversion of the signals transmitted via optical fibers into electrical signals. The fact that a change in the branch area is not necessary is particularly important because the branch cables have mostly been laid as underground cables and would be replaced by optical fiber underground cables only at considerable cost.

However, since additional electronic subassemblies are necessary for the conversion of optical signals into electrical signals, more space is required for these active components. The problem lies in their accommodation. Only seldom is it possible to arrange a further housing alongside an existing CBP. Therefore, underground containers to accommodate additional electronic subassemblies are provided as additional housings. During the installation of new networks, above-ground cable branching points can be dispensed with, by all the subassemblies being arranged in underground containers.

The problems in the case of the underground containers reside in the sealing of the housing, including the cable lead-throughs, the dissipation of heat (if active components are accommodated), the protection of the components during mounting work and the mechanical strength with respect to vehicles rolling over the said containers.

SUMMARY OF THE INVENTION

The problem of specifying a suitable underground container is provided by the present invention which provides an underground container that includes an open frame that encloses an open top of a container. The open top of the container includes an outwardly extending upper rim. The open frame includes at least one wall that extends upward above the upper rim of the container and downward beneath the upper rim of the container.

In an embodiment, the container includes at least one wall having an outer surface, the outer surface includes a plurality of vertically extending and outwardly protruding ribs. The open frame is connected to and supported by the ribs.

In an embodiment, the container also includes a sealing cover that rests on top of the upper rim of the container as well as a load bearing cover that is disposed on top of the sealing cover.

In an embodiment, the load bearing cover is supported by the upper ends of the ribs.

In an embodiment, the load bearing cover includes a casting frame that includes an inverted U-shaped flange that mateably accommodates an upper end of the open frame. The casting frame also includes a bottom end or panel that rests on top of the ribs. The casting frame accommodates a layer or slab of concrete that serves as the load bearing cover for the container.

In an embodiment, the sealing cover is attached to the upper rim of the container with a plurality of threaded fasteners.

In an embodiment, the sealing cover is attached to the upper rim of the container with a plurality of spring biased fasteners.

In an embodiment, the wall of the container includes at least one aperture for accommodating a lead through flanged fitting which includes a cover plate that is accommodated in the aperture and at least one line passageway passing through the cover plate for permitting a cable to pass therethrough.

In an embodiment, the lined passageway includes a tube that extends outward from the plate. The tube has an internal diameter that decreases as the tube extends away from the plate thereby permitting the tube to accommodate cables of varying outside diameters by cutting the tube to an appropriate length so that the inside diameter of the tube at its distal end closely matches the outside diameter of the cable.

In an embodiment, the container is cubically shaped with four upwardly protruding walls and a flat bottom.

In an embodiment, the container houses a terminal strip that is connected to the cable that enters the container through the lead through flanged fitting. The terminal strip includes a female socket for accommodating a male plug disposed at the end of the cable.

In an embodiment, the container houses a subassembly which is connected to the terminal strip by a flexible connecting line that is also connected to the terminal strip by a plug connector.

The design of the open frame is particularly advantageous. The open frame is open at its underside or has at least openings here, with the result that water and also dirt can pass into the soil.

In an embodiment, the open frame is connected to the container via ribs. By means of the ribs, not only is a stiffening of the container achieved, but they are used at the same time for the dissipation of heat.

The sealing cover seals off the interior of the container completely against moisture and dirt. In addition to conventional screw fitting, quick-action closures for fastening are also possible.

In order not to have to dispatch the heavy concrete cover, a casting frame is provided. This is filled with concrete on site.

For the purpose of better heat dissipation, the underground container is produced from metal. Steel is protected against corrosion by galvanizing and an additional paint layer.

The use of a lead-through flange for the connection of cables of different thickness is expedient. Different flange types can be used. In the case of a flange it is also possible for the appropriate openings to be broken open as required. Likewise, prefabricated cable sections including a flange can be used, which then need only to be screwed on.

Other objects and advantages of the invention will become apparent upon reference to the detailed description and upon reference to the accompanying drawings.

BRIEF DESCRIPTION OF THE DRAWINGS

An exemplary embodiment of the invention is explained in more detail using figures, in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
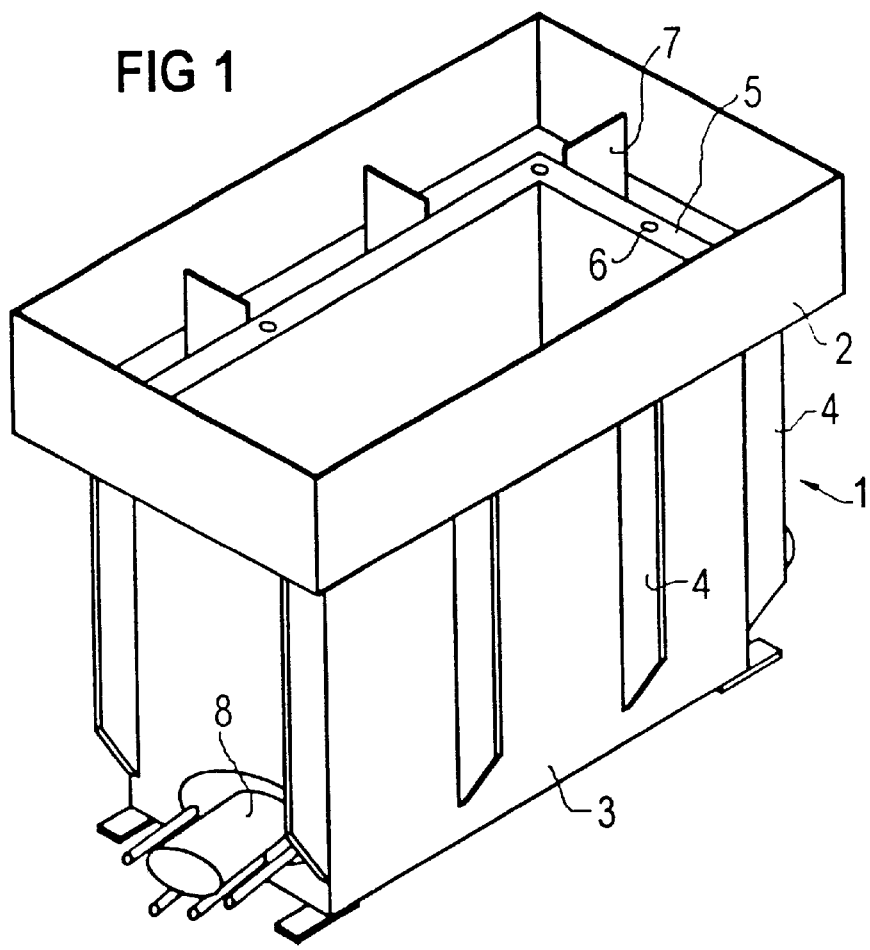
FIG. 1 is a perspective view of an underground container made in accordance with the present invention.

An underground container 1 without cover is illustrated in FIG. 1. The cubicle container 3 is provided on the outside with ribs 4, around which a rectangular open frame 2 is placed. The ribs can be welded onto the container 3, likewise the open frame can be fastened to the cooling ribs by welding or else additionally in a positively locking manner.

The side walls of the container are bent over outwards at the top, in order to obtain a bearing surface 5 for the sealing cover, which is not shown in FIG. 1. Fastening holes 6 are provided for the sealing cover 9 (see FIG. 2) to be screwed onto the container 1.

The open frame 2 projects above the bearing surface or upper rim 5 and ends a little underneath it. the upper side of the ribs is adequate as a bearing 7 for a solid concrete cover. However, the latter can also or additionally be fastened to the upper edge of the open frame by means of a further metal frame. Water penetrating from above is drained through the interspace located between the open frame and the container. In addition, this clearance is used to accommodate earth if the sealing cover is cleaned following the removal of the concrete cover. The said sealing cover performs the actual sealing off of the container against water and dust.

In order to insert cables into the underground container, standard cable lead-throughs can be used. In the case of the underground container illustrated, a lead-through flange 8 is used which has a plurality of lead-through fittings. The loop of an uncut cable can be inserted through the oval lead-through fitting. the lead-through openings are completely sealed off. The lead-through flange itself is screwed on from the outside. This permits the laying of prefabricated cable lengths having a flange already connected.

Figure 2:
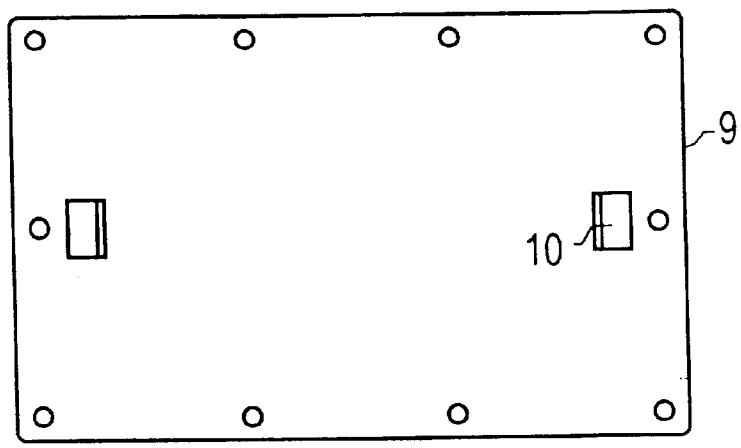
FIG. 2 is a top plan view of a sealing cover for the container shown in FIG. 1.
Figure 3:
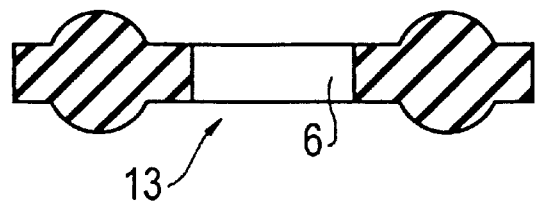
FIG. 3 is a sectional view of an associated seal disposed between the container of FIG. 1 and the cover of FIG. 2.

The sealing cover 9 is illustrated in FIG. 2. Handles 10 facilitate its removal. Inserted between container and sealing cover is a sealing frame 13, illustrated in cross-section in FIG. 3, which is matched to the bearing surface 5.

Figure 4:
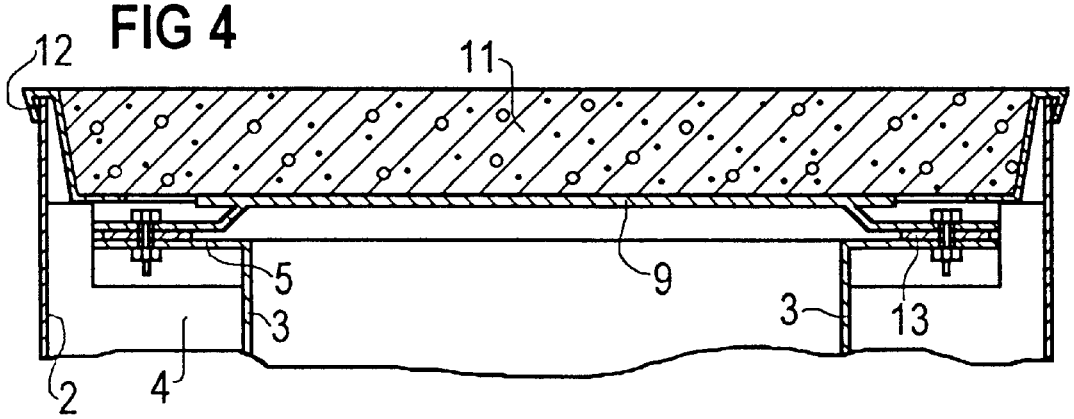
FIG. 4 is a sectional view of a concrete cover disposed on top of the container and sealing cover shown in FIGS. 1 and 2.

FIG. 4 shows the upper part of the underground container with the covers in place. The sealing cover 9 is screwed onto the housing 3. Placed on top of this is a mechanically rigid load-bearing cover 11, here a concrete cover or slab. The concrete cover can be cast at the mounting side with the aid if a casting frame 12. The fact that the casting frame 12 projects around the upper end of the open frame 2 results with an inverted U-shaped flange in good sealing against water or earth coming from above. The bottom end of the frame 12 is supported by the ribs 4. The frame 12 accommodates a slab of concrete 11 to provide a load-bearing cover for the container 1. However, it is also sufficient to insert into the open frame a cover which only rests on the ribs 4.

Instead of a screw fixing of the sealing cover, other types of fastening can also be used.

Figure 5:
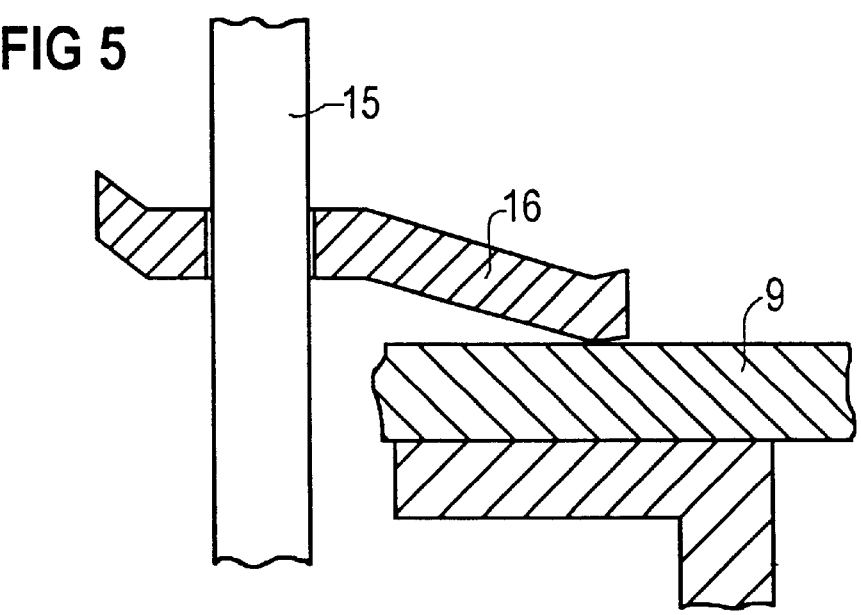
FIG. 5 is a partial sectional view of a quick-action closure used as an alternative to attach the sealing cover of FIG. 2 to the container of FIG. 1.

Illustrated in FIG. 5, as an example, is a clamping hook (wall hook) 16 which can be displaced vertically on a sliding rib 15 and wedges tightly on it. It is possible for all known quick-action closures, such as springs or wedges, to be used. It is also possible to use rapid clamping elements which, after the sealing cover has been pressed on by a screw press, are slipped over the sealing cover 9 and the bearing 7.

Figure 6:
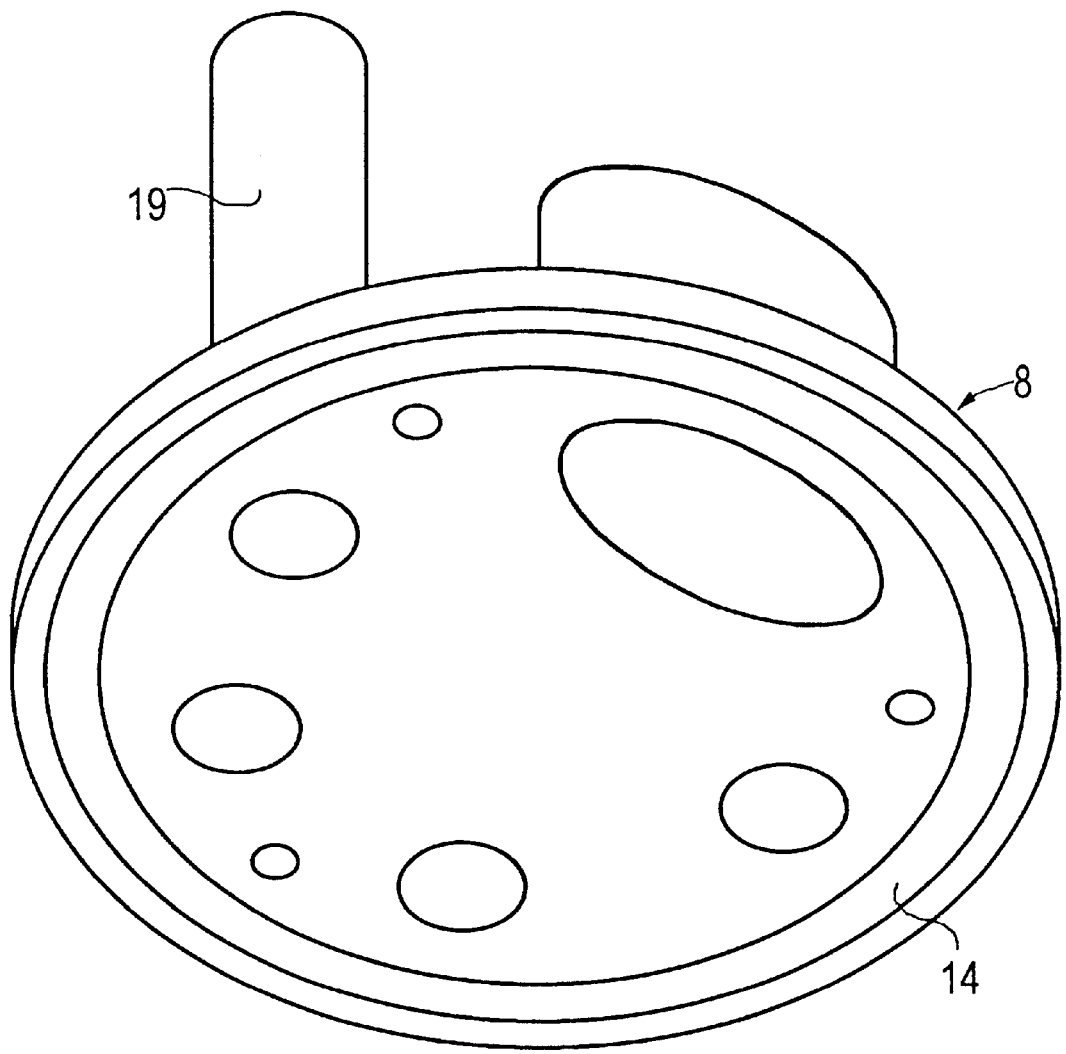
FIG. 6 is a perspective view of a lead-through flange first shown in FIG. 1.

Illustrated in FIG. 6 is the lead-through flange fitting 8, as seen from the direction of the container. Depending on the cable used, different flange designs can be provided. This flange has lead-through fittings 19 having different diameters. By means of a conical design of the lead-through fittings, whose inner diameter increases when they are shortened, the use of cables having different diameters is possible. The sealing between cable and fitting can be effected by means of potting, seals and/or heat-shrink sleeves.

Figure 7:
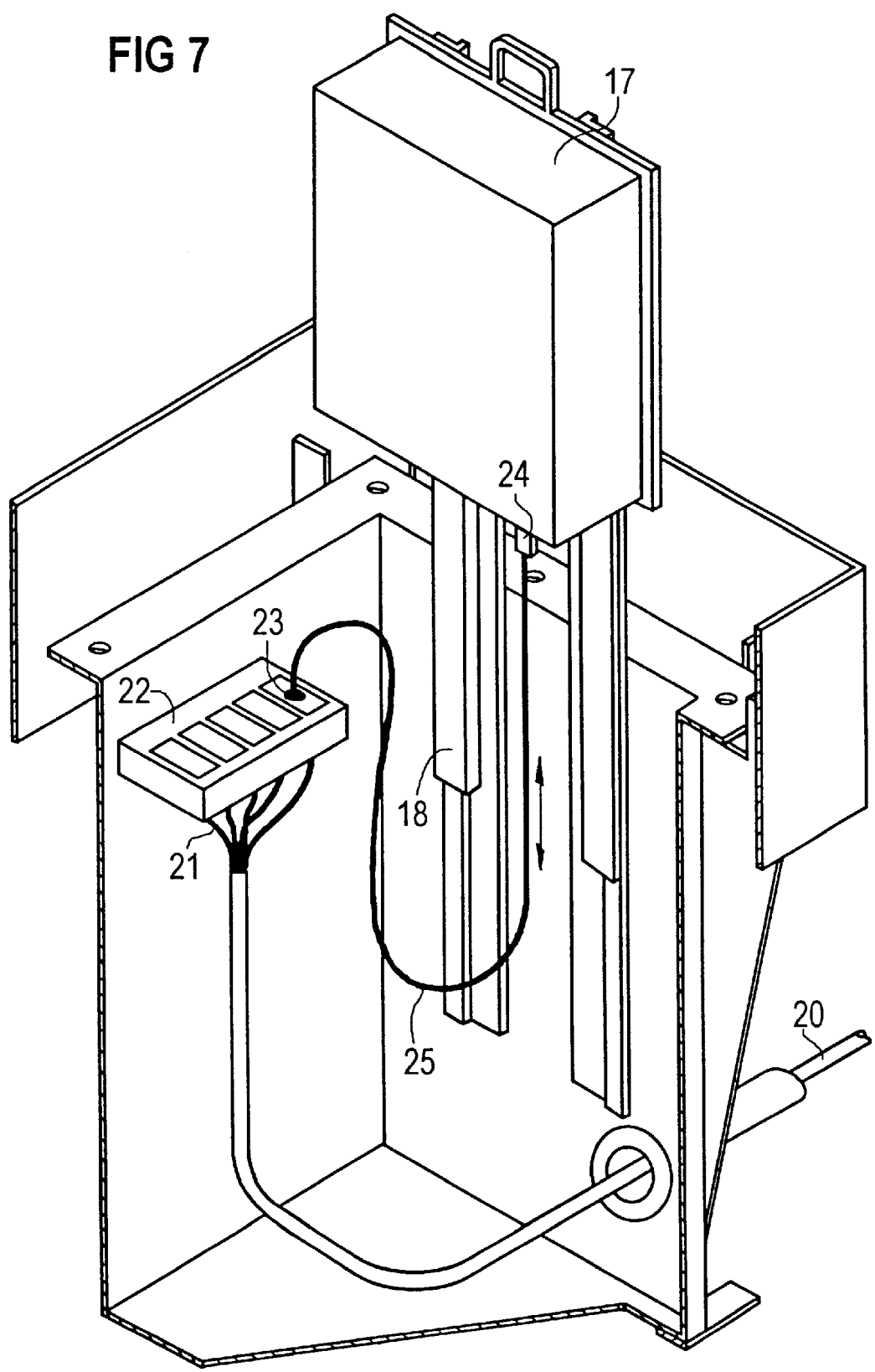
FIG. 7 is a partial perspective view of the equipment housed in the container of the present invention.

FIG. 7 shows the interior of the underground container. By means of sliding rails, electronic subassemblies 17 are pulled upwards for repair or mounting work and held in this position. The wires 21 of the rigid cable 20 are connected to a terminal strip 22. A prefabricated cable can also be provided with a plug connector, which is screwed tight or plugged into an appropriate connecting strip. The subassemblies, here the subassembly 17, are in each case connected via a flexible connecting line 25 via plugs 23, 24. If the subassembly is pulled up, the connecting cable forms a compensating loop, as illustrated in FIG. 7.

It should be added further that, by means of a ventilator fitted in the closed housing, a uniform distribution of heat within the housing, and hence good cooling is ensured.

From the above description, it is apparent that the objects and advantages of the present invention have been achieved. While only certain embodiments have been set forth, alternative embodiments and various modifications will become apparent from the above description to those skilled in the art. These and other alternatives are considered equivalents and within the spirit and scope of the present invention.

What is claimed:

1. An underground container comprising:
   an open frame that encloses an open top of a container, the open top of the container comprising an outwardly extending upper rim, the open frame comprising at least one wall that extends upward above the upper rim of the container and downward beneath the upper rim of the container; and the container further comprising at least one upwardly protruding wall having an outer surface, the outer surface comprising a plurality of ribs, the open frame being connected to the ribs.

2. The underground container of claim 1 further comprising a sealing cover that rests on top of the upper rim of the container and a load bearing cover that is disposed on top of the sealing cover.

3. The underground container of claim 1 further comprising a sealing cover that rests on top of the upper rim of the container and a load bearing cover that rests on top of the sealing cover, and
wherein the container comprises at least one wall having an outer surface, the outer surface comprising a plurality of ribs, the open frame being connected to the ribs, and
wherein the load bearing cover is at least partially supported by the ribs.

4. The underground container of claim 1 further comprising a sealing cover that rests on top of the upper rim of the container and a load bearing cover that rests on top of the sealing cover, and
wherein the container comprises at least one wall having an outer surface, the outer surface comprising a plurality of ribs, the open frame being connected to the ribs, and
wherein the load bearing cover comprises a casting frame with an upper inverted U-shaped flange that mateably receives an upper end of the open frame, a bottom end which is supported by the ribs and a side wall that connects the flange to the bottom end,
the casting frame accommodating a layer of concrete that is supported over the container.

5. The underground container of claim 1 further comprising a sealing cover that rests on top of the upper rim of the container and a load bearing cover that rests on top of the sealing cover, the sealing cover being attached to the upper rim with a plurality of threaded fasteners.

6. The underground container of claim 1 further comprising a sealing cover that rests on top of the upper rim of the container and a load bearing cover that rests on top of the sealing cover, the sealing cover being attached to the upper rim with a plurality of spring biased fasteners.

7. The underground container of claim 1 wherein the upwardly protruding wall of the container comprises at least one aperture for accommodating a lead through flanged fitting, the lead through flanged fitting comprising a cover plate that is accommodated in the aperture and at least one lined passageway passing through the cover plate for permitting a cable to pass therethrough.

8. The underground container of claim 7 wherein the at least one lined passageway comprises a tube that extends outward from the plate, the tube having an internal diameter that decreases as the tube extends away from the plate.

9. The underground container of claim 1 wherein the container is cubically shaped with four upwardly protruding walls and a flat bottom.

10. The underground container of claim 1 wherein the container houses a terminal strip that is connected to a cable that enters the container through an aperture for accommodating a lead through flanged fitting, the lead through flanged fitting comprising a cover plate that is accommodated in the aperture and at least one lined passageway passing through the cover plate for permitting the cable to pass there through, an end of the cable comprising a male plug, the terminal strip comprising a female socket for accommodating the male plug of the cable.

11. The underground container of claim 10 wherein the container houses a subassembly, the subassembly being connected to the terminal strip by a flexible connecting line that is connected to the terminal strip by a plug connector.

12. An underground container for housing electronic subassemblies and connections between said subassemblies and cables, the underground container comprising:
a plinth-like open frame that encloses an open top of a box-like container, the open top of the container comprising an outwardly extending upper rim, the open frame comprising at least one wall that extends upward above the upper rim of the container and downward beneath the upper rim of the container,
the container comprising four vertical walls, each of said vertical walls having an outer surface, the outer surfaces of the walls each being connected to at least one outwardly protruding vertical rib, the open frame being connected to the ribs,
the upper rim of the container supporting and being connected to a sealing cover that rests on top of the upper rim of the container, the sealing cover including a top surface,
the ribs each having an upper end that supports a load bearing cover that engages the top surface of the sealing cover.

13. The underground container of claim 12 wherein the load bearing cover further comprises a casting frame with an upper inverted U-shaped flange that mateably receives an upper end of the open frame, a bottom end which is supported by the ribs and a side wall that connects the flange to the bottom end,
the casting frame accommodating a layer of concrete that serves as a load bearing material of said load bearing cover for the container.

14. The underground container of claim 12 wherein the sealing cover is attached to the upper rim with a plurality of threaded fasteners.

15. The underground container of claim 12 wherein the sealing cover is attached to the upper rim with a plurality of spring biased fasteners.

16. The underground container of claim 12 wherein the container further comprises at least one aperture for accommodating a lead through flanged fitting, the lead through flanged fitting comprising a cover plate that is accommodated in the aperture and at least one lined passageway passing through the cover plate for permitting a cable to pass there through.

17. The underground container of claim 16 wherein the lined passageway comprises a tube that extends outward from the plate, the tube having a conically configured internal diameter that decreases as the tube extends away from the plate thereby enabling cables of different outside diameters to be snugly fitted to the tube by cutting the tube to a length whereby the internal diameter of the end of the tube closely matches but slightly exceeds the outside diameter of the cable.

18. An underground container for housing electronic subassemblies and connections between said subassemblies and cables, the underground container comprising:
a plinth-like open frame that encloses an open top of a box-like container, the open top of the container comprising an outwardly extending upper rim, the open frame comprising at least one wall that extends upward above the upper rim of the container and downward beneath the upper rim of the container,
the container comprising four vertical walls, each of said vertical walls having an outer surface, the outer surfaces of the walls each being connected to at least one outwardly protruding vertical rib, the open frame being connected to the ribs, the upper rim of the container supporting and being releasably connected to a sealing cover that rests on top of the upper rim of the container, the sealing cover being removable thereby permitting access to an inside of the container, the sealing cover including a top surface, the ribs each having an upper end that supports a load bearing cover that engages the top surface of the sealing cover, the load bearing cover further comprises a casting frame with an upper inverted U-shaped flange that mateably receives an upper end of the open frame, a bottom end which is supported by the ribs and a side wall that connects the flange to the bottom end, the casting frame accommodating a layer of concrete that serves as a load bearing material for said load bearing cover for the container, the container further comprising at least one aperture for accommodating a lead through flanged fitting, the lead through flanged fitting comprising a cover plate that is accommodated in the aperture and at least one lined passageway passing through the cover plate for permitting a cable to pass there through, the lined passageway comprises a tube that extends outward from the plate, the tube having a conically configured internal diameter that decreases as the tube extends away from the plate thereby enabling cables of different outside diameters to be snugly fitted to the tube by cutting the tube to a length whereby the internal diameter of the end of the tube closely matches but slightly exceeds the outside diameter of the cable.

19. An underground container comprising:

an open frame that encloses an open top of a container, the open top of the container comprising an outwardly extending upper rim, the open frame comprising at least one wall that extends upward above the upper rim of the container and downward beneath the upper rim of the container and, the container comprising a sealing cover that rests on top of the upper rim of the container and a load bearing cover that is disposed on top of the sealing cover.

20. The underground container of claim 19 wherein the container comprises at least one upwardly protruding wall having an outer surface, the outer surface comprising a plurality of ribs, the open frame being connected to the ribs.

21. The underground container of claim 19 wherein the container comprises at least one wall having an outer surface, the outer surface comprising a plurality of ribs, the open frame being connected to the ribs, and wherein the load bearing cover is at least partially supported by the ribs.

22. The underground container of claim 19 wherein the container comprises at least one wall having an outer surface, the outer surface comprising a plurality of ribs, the open frame being connected to the ribs, and wherein the load bearing cover comprises a casting frame with an upper inverted U-shaped flange that mateably receives an upper end of the open frame, a bottom end which is supported by the ribs and a side wall that connects the flange to the bottom end, the casting frame accommodating a layer of concrete that is supported over the container.

23. The underground container of claim 19 wherein the sealing cover is attached to the upper rim with a plurality of threaded fasteners.

24. The underground container of claim 19 wherein the sealing cover is attached to the upper rim with a plurality of spring biased fasteners.

25. The underground container of claim 19 wherein the container further comprises at least one upwardly protruding wall, the upwardly protruding wall of the container comprises at least one aperture for accommodating a lead through flanged fitting, the lead through flanged fitting comprising a cover plate that is accommodated in the aperture and at least one lined passageway passing through the cover plate for permitting a cable to pass therethrough.

26. The underground container of claim 25 wherein the at least one lined passageway comprises a tube that extends outward from the plate, the tube having an internal diameter that decreases as the tube extends away from the plate.

27. The underground container of claim 19 wherein the container is cubically shaped with four upwardly protruding walls and a flat bottom.

28. The underground container of claim 19 wherein the container houses a terminal strip that is connected to a cable that enters the container through an aperture for accommodating a lead through flanged fitting, the lead through flanged fitting comprising a cover plate that is accommodated in the aperture and at least one lined passageway passing through the cover plate for permitting the cable to pass there through, an end of the cable comprising a male plug, the terminal strip comprising a female socket for accommodating the male plug of the cable.

29. The underground container of claim 28 wherein the container houses a subassembly, the subassembly being connected to the terminal strip by a flexible connecting line that is connected to the terminal strip by a plug connector.

30. An underground container comprising:

an open frame that encloses an open top of a container, the open top of the container comprising an outwardly extending upper rim, the open frame comprising at least one wall that extends upward above the upper rim of the container and downward beneath the upper rim of the container, wherein the container further comprises at least one wall having an outer surface, the outer surface comprising a plurality of ribs, the open frame being connected to the ribs, wherein the container further comprises a sealing cover that rests on top of the upper rim of the container and a load bearing cover that is disposed on top of the sealing cover, and wherein the container comprises at least one wall having an outer surface, the outer surface comprising a plurality of ribs, the open frame being connected to the ribs, and wherein the load bearing cover is at least partially supported by the ribs.

31. The underground container of claim 30 wherein the load bearing cover comprises a casting frame with an upper inverted U-shaped flange that mateably receives an upper end of the open frame, a bottom end which is supported by the ribs and a side wall that connects the flange to the bottom end, the casting frame accommodating a layer of concrete that is supported over the container.

32. The underground container of claim 30 wherein the sealing cover is attached to the upper rim with a plurality of threaded fasteners.

33. The underground container of claim 30 wherein the sealing cover is attached to the upper rim with a plurality of spring biased fasteners.

34. The underground container of claim 30 wherein the upwardly protruding wall of the container comprises at least one aperture for accommodating a lead through flanged fitting, the lead through flanged fitting comprising a cover plate that is accommodated in the aperture and at least one lined passageway passing through the cover plate for permitting a cable to pass therethrough.

35. The underground container of claim 34 wherein the at least one lined passageway comprises a tube that extends outward from the plate, the tube having an internal diameter that decreases as the tube extends away from the plate.

36. The underground container of claim 30 wherein the container is cubically shaped with four upwardly protruding walls and a flat bottom.

37. The underground container of claim 30 wherein the container houses a terminal strip that is connected to a cable that enters the container through an aperture for accommodating a lead through flanged fitting, the lead through flanged fitting comprising a cover plate that is accommodated in the aperture and at least one lined passageway passing through the cover plate for permitting the cable to pass there through, an end of the cable comprising a male plug, the terminal strip comprising a female socket for accommodating the male plug of the cable.

38. The underground container of claim 37 wherein the container houses a subassembly, the subassembly being connected to the terminal strip by a flexible connecting line that is connected to the terminal strip by a plug connector.

* * * * *